United States Patent
Hong et al.

(10) Patent No.: US 9,781,179 B2
(45) Date of Patent: *Oct. 3, 2017

(54) METHOD AND APPARATUS FOR SHARING PRESENTATION DATA AND ANNOTATION

(71) Applicant: SAMSUNG ELECTRONICS CO., LTD., Suwon-si (KR)

(72) Inventors: Jung-kih Hong, Seoul (KR); Min-suk Choi, Gumi-si (KR); Yoon-suk Choi, Gwacheon-si (KR); Sang-Il Lee, Suwon-si (KR); Seong-hoon Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/470,050

(22) Filed: Mar. 27, 2017

(65) Prior Publication Data

US 2017/0201553 A1    Jul. 13, 2017

Related U.S. Application Data

(63) Continuation of application No. 14/949,176, filed on Nov. 23, 2015, now Pat. No. 9,609,033, which is a
(Continued)

(30) Foreign Application Priority Data

Apr. 26, 2012  (KR) .................. 10-2012-0043899

(51) Int. Cl.
*G06F 13/00*  (2006.01)
*G06F 15/00*  (2006.01)
(Continued)

(52) U.S. Cl.
CPC ........ *H04L 65/403* (2013.01); *G06F 3/04883* (2013.01); *G06F 17/241* (2013.01);
(Continued)

(58) Field of Classification Search
CPC ...................................... G06F 9/4443
(Continued)

(56) References Cited

U.S. PATENT DOCUMENTS

2002/0085030 A1* 7/2002 Ghani ............... G06Q 10/10
                                                     715/751
2006/0075348 A1   4/2006 Xu et al.
(Continued)

FOREIGN PATENT DOCUMENTS

CN       1394410 A       1/2003
CN       101018315 A     8/2007
(Continued)

OTHER PUBLICATIONS

Communication dated Nov. 30, 2016, issued by the State Intellectual Property Office of P.R. China in counterpart Chinese application No. 201380019947.0.
(Continued)

*Primary Examiner* — Kevin Nguyen
(74) *Attorney, Agent, or Firm* — Sughrue Mion, PLLC

(57) ABSTRACT

A method and apparatus for sharing presentation data, interactions, and annotation information between devices. The method includes: converting the presentation data into at least one image; transmitting the at least one image to the second device; displaying an image from among the at least one image on a screen of the first device, and transmitting image identification information about the displayed image to the second device; adding annotation data to the displayed image, based on a user input; and transmitting annotation information about the annotation data to the second device.

(Continued)

The second device displays an image corresponding to the image identification information on a screen of the second device based on the image identification information, and the second device displays the annotation information on the image displayed on the screen of the second device the annotation information.

23 Claims, 10 Drawing Sheets

Related U.S. Application Data continuation of application No. 13/859,282, filed on Apr. 9, 2013, now abandoned.

(51) Int. Cl.
*H04L 29/06* (2006.01)
*H04L 29/08* (2006.01)
*G06F 17/24* (2006.01)
*G06F 3/0488* (2013.01)

(52) U.S. Cl.
CPC ............ *H04L 65/601* (2013.01); *H04L 67/02* (2013.01); *H04L 67/06* (2013.01)

(58) Field of Classification Search
USPC .......................... 715/751–753, 758, 853–854
See application file for complete search history.

(56) References Cited

U.S. PATENT DOCUMENTS

| | | |
|---|---|---|
| 2006/0265665 A1 | 11/2006 | Yoshida |
| 2010/0095198 A1 | 4/2010 | Bultrowicz et al. |
| 2010/0153887 A1 | 6/2010 | Yamaguchi et al. |
| 2010/0318399 A1 | 12/2010 | Li et al. |
| 2011/0025712 A1 | 2/2011 | Ikeda et al. |
| 2011/0119713 A1 | 5/2011 | Chang et al. |
| 2011/0258526 A1 | 10/2011 | Supakkul et al. |
| 2011/0264745 A1 | 10/2011 | Ferlitsch |
| 2011/0265034 A1 | 10/2011 | Garin et al. |
| 2011/0273309 A1 | 11/2011 | Zhang et al. |
| 2011/0283206 A1 | 11/2011 | Brown |
| 2011/0313865 A1 | 12/2011 | Sinyagin et al. |
| 2011/0313899 A1 | 12/2011 | Drey |
| 2011/0320114 A1 | 12/2011 | Buxton et al. |
| 2012/0005020 A1 | 1/2012 | Ramer et al. |
| 2012/0016653 A1 | 1/2012 | Bhandar et al. |
| 2012/0023521 A1 | 1/2012 | Lordan et al. |
| 2012/0047234 A1 | 2/2012 | Terayoko |
| 2012/0297078 A1 | 11/2012 | Hong et al. |
| 2013/0011062 A1* | 1/2013 | Conwell ........... G06F 17/30265 382/173 |
| 2013/0072170 A1 | 3/2013 | Hong et al. |

FOREIGN PATENT DOCUMENTS

| | | |
|---|---|---|
| CN | 101056386 A | 10/2007 |
| EP | 1503344 A2 | 2/2005 |
| JP | 2010-146115 A | 7/2010 |
| KR | 10-0834543 B1 | 6/2008 |
| KR | 10-1000893 B1 | 12/2010 |
| KR | 10-2011-0052997 A | 5/2011 |
| KR | 10-2012-0129597 A | 11/2012 |
| KR | 10-2013-0030107 A | 3/2013 |

OTHER PUBLICATIONS

Communication dated Nov. 24, 2015, issued by the European Patent Office in counterpart European Application No. 13780930.7.
Notification of transmittal of ISR and Written Opinion for PCT/KR2013/002553 dated Jul. 12, 2013 [PCT/ISA/220].
International Search Report for PCT/KR2013/002553 dated Jul. 12, 2013 [PCT/ISA/210].
Written Opinion for PCT/KR2013/002553 dated Jul. 12, 2013 [PCT/ISA/237].
Office Action issued in parent U.S. Appl. No. 13/859,282, dated Mar. 3, 2015.
Notice of Allowance issued in parent U.S. Appl. No. 13/859,282, dated Mar. 3, 2015.
Communication dated May 22, 2017 issued by the European Patent Office in counterpart Application No. 13 780 930.7.
Communication dated Jul. 24, 2017 issued by the State Intellectual Property of P.R. China in counterpart Application No. 201380019947.0.

* cited by examiner

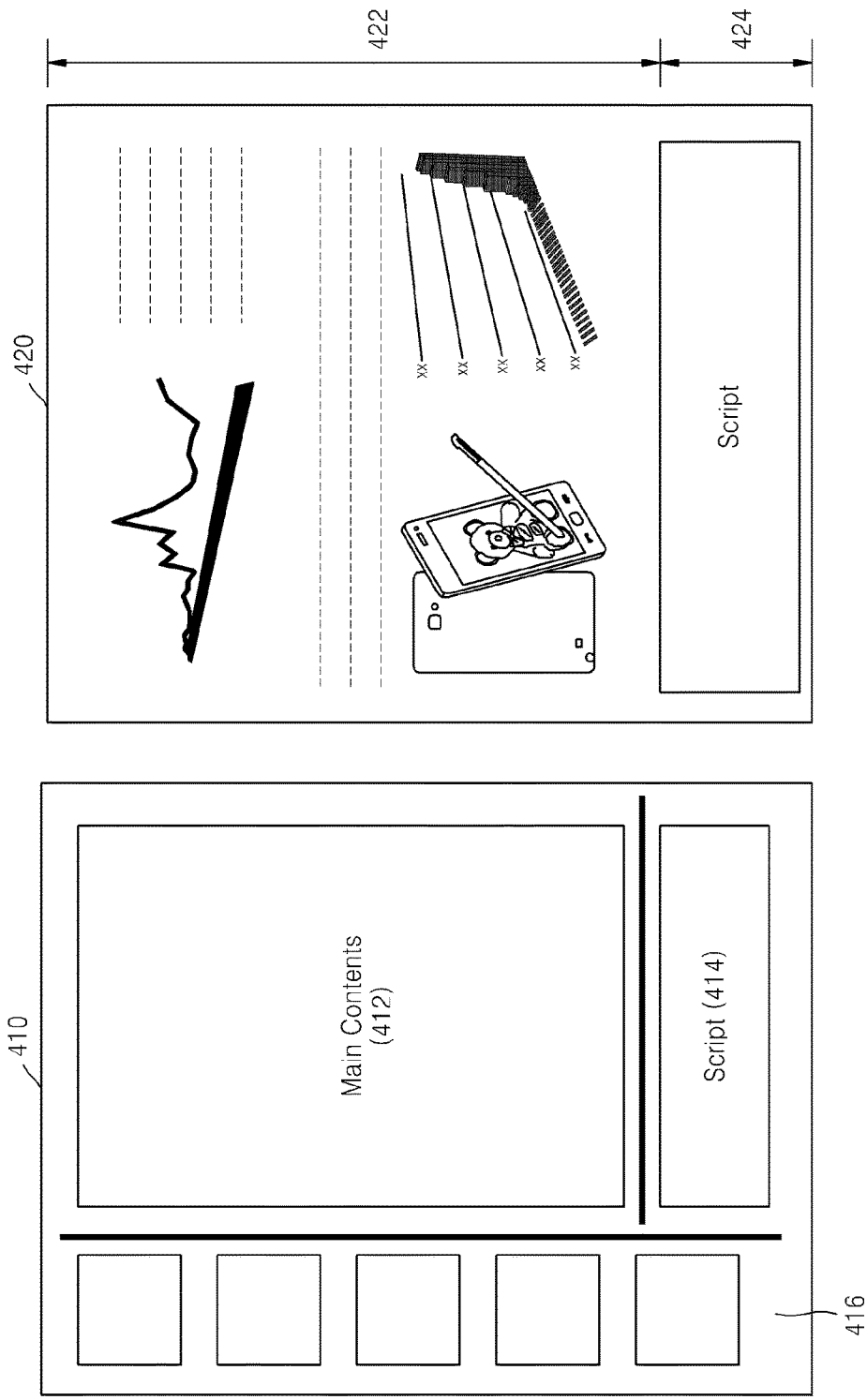

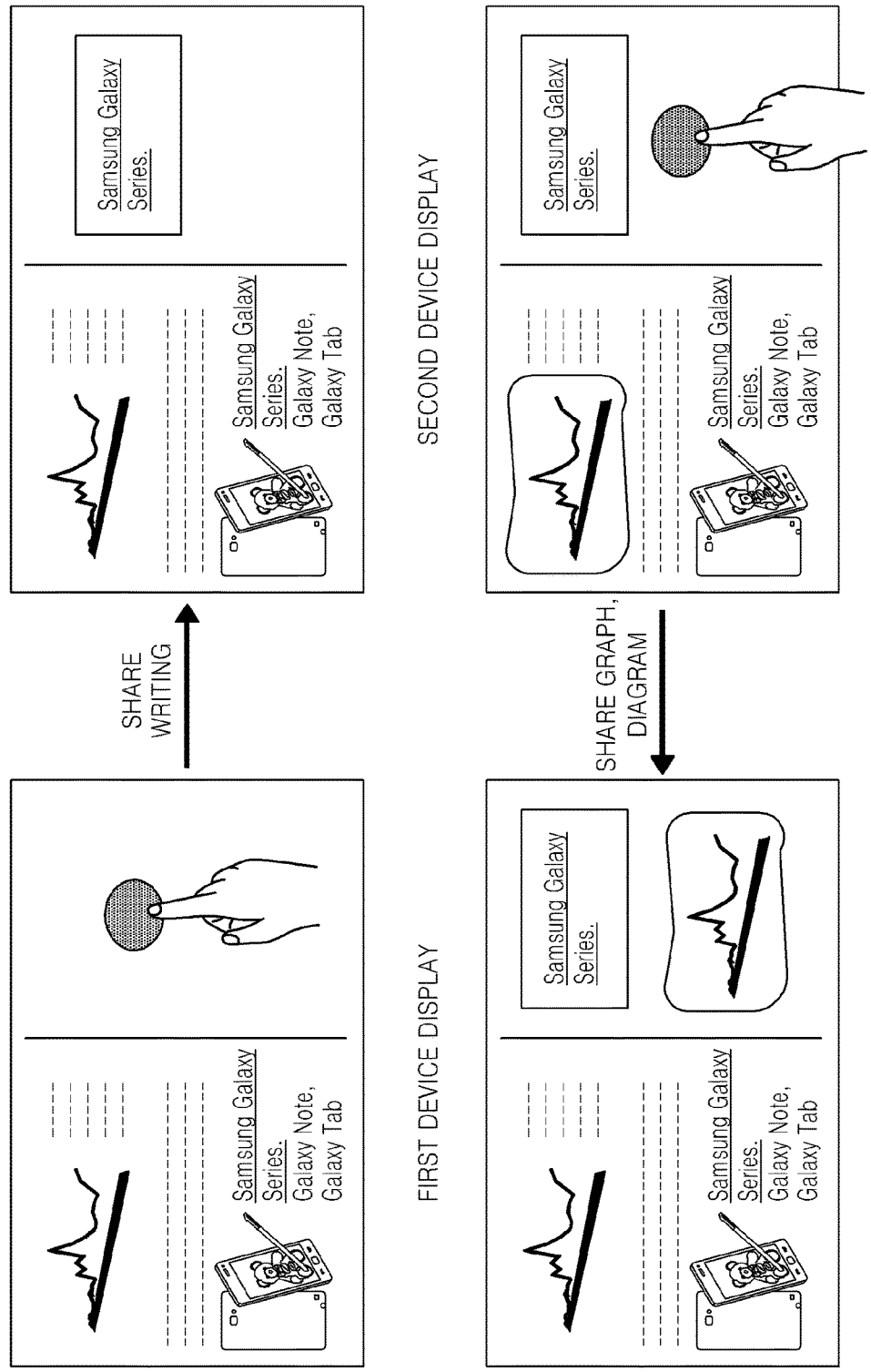

METHOD AND APPARATUS FOR SHARING PRESENTATION DATA AND ANNOTATION

CROSS-REFERENCE TO RELATED PATENT APPLICATION

This is a continuation of U.S. application Ser. No. 14/949,176, filed Nov. 23, 2015, which is a continuation of U.S. application Ser. No. 13/859,282, filed Apr. 9, 2013, which claims priority from Korean Patent Application No. 10-2012-0043899, filed on Apr. 26, 2012, in the Korean Intellectual Property Office, the disclosures of which are incorporated herein in their entirety by reference.

BACKGROUND

1. Field

The present inventive concept relates to a method and apparatus for allowing a plurality of users to share presentation data between their devices, and more particularly, to sharing a document to be used in a presentation and synchronizing additional records, e.g., an annotation and memo, which a user inputs in relation to the document, and an interaction, e.g., a page change, with the document.

2. Description of the Related Art

Conventionally, a method of sharing a presentation is classified according to an instructor and students or according to a host and participants. Although a presentation is performed bi-directionally, there are restrictions to sharing the presentation in terms of various usabilities and limited accessibility to a plurality of users. Furthermore, it is inconvenient to share a large amount of presentation materials and it is difficult to obtain and manage annotation histories about the presentation materials.

As types of smart devices have diversified and a frequency of use thereof has increased, a number of users who desire to display various contents on screens of their smart devices has increased. Also, an increasing number of users tend to share contents displayed on their smart devices with other users. Furthermore, an increasing number of users tend to share interactions occurring in, for example, meetings, conferences, or classrooms, in an easy and intuitive manner.

SUMMARY

The present inventive concept involves providing appropriate user experiences to a user who uses a device and participates in a meeting or a discussion with a plurality of other users. A paperless office may be established by converting conference materials into an image and immediately transmitting and sharing the image, and sharing information to be added during a conference, e.g., a memo, an annotation, etc. Furthermore, a detailed record about the conference may be preserved without having to take additional minutes.

The present inventive concept also provides smart synchronization for synchronizing annotation information added during a conference even if a user participates late in the conference.

According to an aspect of the present inventive concept, there is provided a method, performed by a first device, of sharing presentation data with a second device, the method including: converting the presentation data into at least one image; transmitting the at least one image to the second device; displaying an image from among the at least one image on a screen of the first device, and transmitting image identification information about the displayed image to the second device; adding annotation data to the displayed image, based on a user input; and transmitting annotation information about the annotation data to the second device, wherein the second device displays an image corresponding to the image identification information on a screen of the second device based on the image identification information, and the second device displays the annotation information on the image displayed on the screen of the second device based on the annotation information.

The method may further include transmitting image identification information about the switched image to the second device, when the image displayed on the screen of the first device is switched to another image, wherein the second device displays an image corresponding to the image identification information about the switched image on the screen of the second device based on the image identification information about the switched image.

The method may further include: receiving annotation information generated by the second device from the second device; and displaying annotation data included in the received annotation information on the image displayed on the screen of the first device.

The transmitting annotation information to the second device may include if a record mode of the first device is a private memo mode, preventing the annotation information from being transmitted to the second device, and if the record mode of the first device is a public writing mode, transmitting the annotation information to the second device.

According to another aspect of the present inventive concept, there is provided a method, performed by a second device, of sharing presentation data with a first device, the method may include: receiving presentation data converted into at least one image, and image identification information about an image displayed on a screen of the first device, from the first device; displaying, from among the at least one image, an image corresponding to the image identification information on a screen of the second device; receiving annotation information from the first device; and displaying annotation data on the image displayed on the screen of the second device, based on the received annotation information, wherein the received annotation information includes annotation data added to the image displayed on the screen of the first device, based on a user input of the first device.

The method may further include: receiving switched image identification information from the first device; and display an image corresponding to the switched image identification information on the screen of the second device, wherein the switched image identification information identifies an image switched from the image displayed on the first device.

The displaying annotation data may include displaying only the annotation data based on a user input of the second device when a view mode of the second device is a private view mode, and displaying the annotation data based on the user input of the second device together with the annotation data based on the annotation information received from the first device when the view mode of the second device is a public view mode.

When the view mode of the second device is a user view mode, displaying the annotation data may include in the annotation information received from the first device, according to a setting of the user view mode.

The displaying an image corresponding to the switched image identification information on the screen of the second device may include switching the image displayed on the screen of the second image to another image, based on the switched image identification information received from the first device, when the second device is in a page non-synchronization mode, and switching the image displayed on the screen of the second image to another image, based on a user input of the second device, when the second device is in a page synchronization mode.

According to still another aspect of the present inventive concept, there is provided a first device for sharing presentation data with a second device, the first device including: a data conversion unit which converts presentation data into at least one image; a display unit which displays an image from among the at least one image on a screen of the first device; an input interface which receives annotation data; an information processor which generates image identification information about the displayed image and annotation information including the annotation data; and a communication unit which transmits the at least one image, the image identification information, and the annotation information to the second device, wherein an image corresponding to the image identification information is displayed on a screen of the second device, and the second device displays the annotation information on the image displayed on the screen of the second device based on the annotation information.

According to yet another aspect of the present inventive concept, there is provided a second device for sharing presentation data with a first device, the second device including: a communication unit which receives at least one image, image identification information about an image displayed on a screen of the first device, and annotation information, from the first device; a display unit which displays an image, from among the at least one image, corresponding to the image identification information on a screen of the second device, and displays annotation data on the image displayed on the screen of the second device, wherein the received annotation information includes annotation data added to the image displayed on the screen of the first device, based on a user input of the first device.

BRIEF DESCRIPTION OF THE DRAWINGS

The above and other features and advantages of the present inventive concept will become more apparent by describing in detail exemplary embodiments thereof with reference to the attached drawings in which:

FIG. 4 illustrates a method of converting presentation data into an image when the presentation data includes a main content, and scripts or annotation, according to an exemplary embodiment;

FIG. 5 illustrates a method of sharing annotation information between devices of a system, according to an exemplary embodiment;

DETAILED DESCRIPTION

As used herein, the term "and/or" includes any and all combinations of one or more of the associated listed items.

Figure 1:
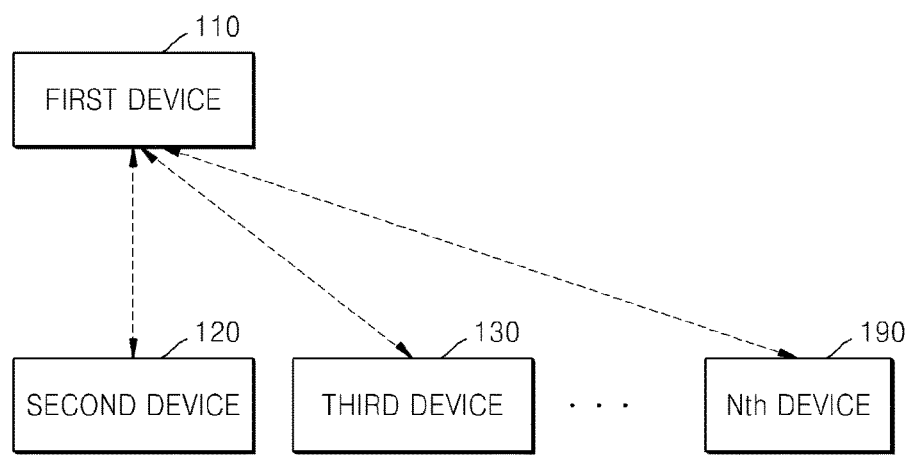
FIG. 1 is a block diagram of a presentation data sharing system according to an exemplary embodiment.

FIG. 1 is a block diagram of a presentation data sharing system according to an exemplary embodiment. Referring to FIG. 1, a first device 110 acts as a host device. Presentation data displayed on the first device 110 is transmitted to a plurality of devices included in the presentation data sharing system, e.g., a second device 120, a third device 130, and an Nth device 190. The presentation data having the same format as that of the first device 110 may be directly transmitted to another device, or may be converted to another format, e.g., an image format or a pdf file format, and then transmitted to another device.

The same content is displayed on the screens of the plurality of devices included in the presentation data sharing system unless particular circumstances occur. In detail, the screens of all the plurality of devices are synchronized according to the content displayed on the first device 110 acting as the host device but content displayed on another device that does not act as the host device may be displayed on the screens of the other devices through an additional setting operation. Generally, in the present inventive concept, the first device 110 means the host device. For example, if during a conference, a user of the third device 130 has some pertinent material, then a reference device synchronized with the first device 110 or a host of the conference may be requested to be switched from the first device 110 to the third device 130. In other words, the third device 130 may transmit a request to switch the reference device to the host device, and the reference device may be switched when the host device accepts the request. Inversely, the first device 110 may transmit this request to the third device 130, and the reference device may be switched when the third device 130 accepts the request. However, the present inventive concept is not limited to the above methods and any of other various methods may be used.

A user of the host device may add additional records in various formats to a displayed screen image. For example, particular content may be underlined or an annotation may be inserted into the displayed screen image. Otherwise, an additional diagram may be inserted into or particular content may be deleted from the displayed screen image. Such various edited items mentioned above may be synchronized with the other devices of the presentation data sharing system so that they are also displayed on the screens of the other devices. Hereinafter, such additional records are referred to as 'annotation data'.

In detail, when such an additional record is input to a device by using a user input interface, e.g., a keypad, a touchpad, a stylus, or an S-pen, annotation information including annotation data is generated. The annotation information is transmitted to the other devices of the presentation data sharing system. Each of the other devices receiving the annotation information displays the annotation data, e.g., underlines, memos, annotations, or the like, on the screen thereof, based on the annotation information. If the specifications of a device are not the same as those of the host device, the annotation data may be synchronized through a transformation process, e.g., resizing or a color change.

The user of the host device may modify content displayed on the screen thereof. For example, when presentation data consists of several pages, a current page may be switched to a subsequent page, a preceding page, or a page corresponding to a desired page number. Hereinafter, a page may be understood as an image. A displayed image may be expanded or moved in a desired direction. The host device receiving such a command via a user input interface transmits information for performing an operation corresponding to the command, to another device. For example, when a page change is performed, identification (ID) information indicating a current page may be transmitted. Such image ID information may be referred to as 'user interaction information'. A device receiving the user interaction information displays a page corresponding to the user interaction information.

The presentation data sharing system performing the above operations described above with reference to FIG. 1 does not need a conventional server. For example, the above operations may be performed via the internet, an intranet, Wi-Fi, or a Wibro communication network. Any device capable of receiving and transmitting data via a communication network may be applied to a third-generation (3G) or fourth-generation (4G) communication environment.

The present inventive concept is available to a system including smart devices. Examples of smart devices include smart phones, tablets, personal computers (PCs), and smart televisions (TVs) having various screen resolutions. The host device may be a general PC but the second, third, and/or Nth device may be smart devices or notebook computers (e.g., lap-top computers). A system according to an exemplary embodiment may be applied to any device capable of using a network and is not limited to the above description.

Figure 2:
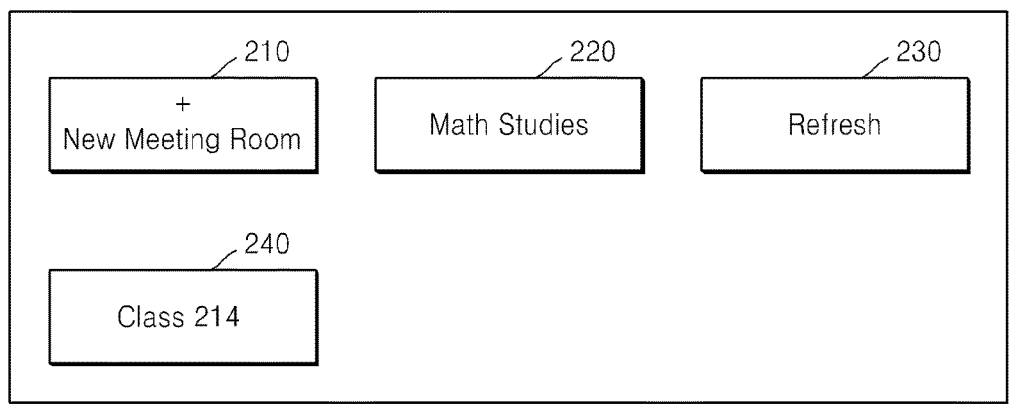
FIG. 2 illustrates a screen image for setting up a meeting room, according to an exemplary embodiment.

FIG. 2 illustrates a screen image for establishing a meeting room, according to an embodiment. A user may select a '+ New Meeting Room' 210 to set up a new meeting room. The established meeting room may have various attributes according to a user setting. The meeting room may be open to all devices that are accessible to the meeting room or may be open to a limited number of devices by setting a password. If a number of devices that may participate in the meeting room is fixed and a number of devices that participate in the meeting room reaches the fixed number of devices, then other devices may be prevented from participating in the meeting room or the meeting room may not appear in the screen image of FIG. 2. When a user sets up a new meeting room as described above, a device of the user may act as a host device.

FIG. 2 illustrates 'Math Studies' 220, 'Refresh' 230, and 'Class 214' 240 as already setup meeting rooms. A device that sets up a meeting room and other devices that participate in the meeting room may form a presentation data sharing system according to an exemplary embodiment as illustrated in FIG. 1.

An interface as described above with reference to FIG. 2 may be provided using an operating system of a device or an application. Otherwise, in some cases, a process of setting up and participating in a meeting room may be omitted. For example, when a user device operates in a predetermined mode, a system that automatically senses the host device and synchronizes presentation materials, annotation data, and interactions with the host device may be automatically set up. This method may be available to a conference that is held in an independent space. Also, even if participants participating in a meeting room join a conference or a lecture late, and thus do not participate from the start of the conference or the lecture, the participants may receive and synchronize all annotation information generated starting from the start of the conference or the lecture.

Figure 3A:
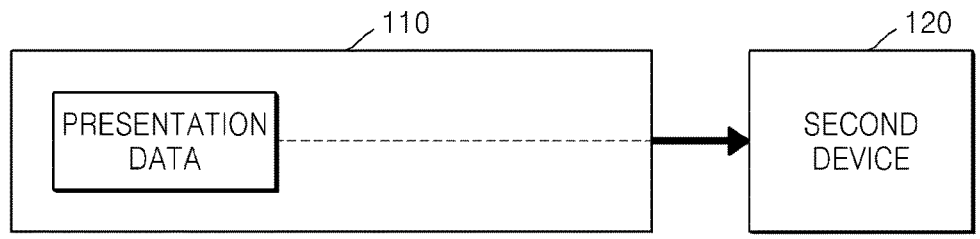
FIGS. 3A and 3B are block diagrams illustrating methods of sharing presentation data, according to an exemplary embodiment.
Figure 3B:
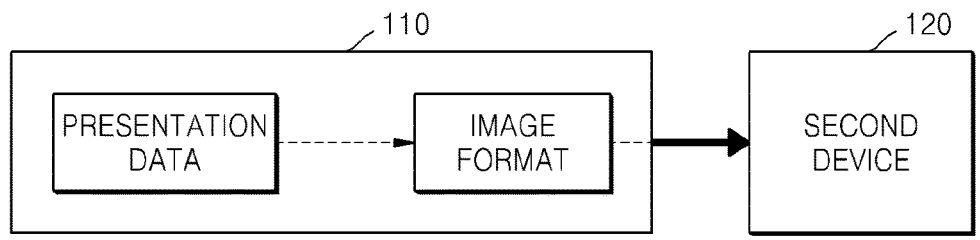

FIGS. 3A and 3B are block diagrams illustrating a method of sharing presentation data, according to an exemplary embodiment. In the present disclosure, the presentation data is not limited to data in a presentation format, e.g., a PowerPoint or Keynote format. Examples of the presentation data may include various types of document files, web pages, and image files. If a lecture is conducted through only writing on a blackboard or blank page of host device, the presentation data may be a blank image to which annotation data may be applied.

Specifically, FIG. 3A illustrates a case where a first device 110 directly transmits presentation data to a second device 120. FIG. 3B illustrates a case where a first device 110 converts presentation data to a desired format and then transmits the presentation data to a second device 120. The method of FIG. 3A is available when the types of all devices included in a system are the same or when all the devices may support the format of the presentation data to be shared. Also, the method of FIG. 3A is available in a network environment appropriate for transmitting the amount of the presentation data. In general, presentation data cannot be used in each device before transmission of the presentation data ends when the presentation data is not converted and is directly transmitted. However, when the presentation data is converted to image files and is then transmitted, the image files may be sequentially displayed in the order that the image files are transmitted, before all the presentation data is transmitted. Thus, a piece of data corresponding to the start of material of a conference may be first transmitted and then the other pieces of the data may be transmitted during the conference.

However, if the types of the devices included in the system are the same or if the types of the devices are different from one another but support the presentation data, then the method of FIG. 3A may not be always guaranteed. Since most devices support image files, the first device 110 may convert presentation data to an image file format and then transmit the presentation data to the second device 120 in this case.

Any of various methods may be performed to convert presentation data to an image file format. Basically, a piece of presentation data corresponding to one page may be converted into one image. Otherwise, a piece of the presentation data corresponding to two pages may be converted into one image. Such a ratio of transformation may be determined in consideration of a resolution of the presentation data and a resolution of a device. For example, when a ratio between the width and height of the presentation data is 1:1 and a ratio between the width and height of the device is 2:1, it may be appropriate to convert a piece of the presentation data corresponding to two pages into one image.

FIG. 4 illustrates a method of converting presentation data into an image when the presentation data includes main contents, and scripts or annotation, according to an exemplary embodiment. A host of a conference or a speaker who will present a particular topic may prepare not only contents to be presented to participants but also scripts or memos. In this case, the presentation data includes main contents that all the participants can view, and script contents that only a user of a host device can view.

A presentation file 410, for example a PowerPoint file, may include main contents 412, script 414, and a slide list 416. When converting the presentation file 410 into an image and transmitting the image to other devices, the host device may convert only content of the main contents 412 into an image and transmit the image to the other devices.

When the presentation data is a general document file 420, the user may add contents corresponding to script by using annotations or memos. In this case, when the presentation file 410 is converted into an image and the image is transmitted to the other devices, the host device may convert only the content of the main contents 422 into an image and transmit the image to the other devices, and may display content corresponding to script 424 on only the host device.

The image converted from the presentation data may be managed in units of pages. Page information may be image ID information. For example, when the page information is '3', an image having the image ID information of '3' may be displayed. Page synchronization may be performed by displaying an image having the same image ID information as that of an image displayed on the host device, on all devices of a system, as will be described in detail with reference to FIG. 7.

The devices of the system may have different resolutions. For example, referring to FIG. 1, the first device 110 may have a resolution of 1024×768, the second device 120 may have a resolution of 960×480, and the third device 130 may have a resolution of 800×600. An image converted from presentation data according to the first device 110 acting as a host device may not be appropriately displayed on another device. When receiving an image generated by the first device 110, each of the devices of the system may resize the image according to a resolution thereof. Otherwise, the first device 110 may receive information about resolutions of the devices of the system, convert the presentation data into images having sizes that may be respectively and appropriately displayed on the devices, based on the received information, and then transmit the images to the devices.

FIG. 5 illustrates a method of sharing annotation information between devices of a system, according to an exemplary embodiment. In the present disclosure, examples of annotation data may include all data that may be displayed on a device via a user interface, e.g., underlines, highlights, annotation, diagrams, charts, memo like notes, hereinafter "notes," content deletion, and the like. For example, when a user of the first device 110 of FIG. 1 desires to focus on a particular portion of presented material in presentation data displayed on the first device 110, via a user input interface, the first device 110 generates annotation information, based on a command input by the user input interface. The annotation information is transmitted to all the devices of the system, including the second device 120 of FIG. 1. Then, the second device 120 may display the annotation data, based on the annotation information, thereby realizing 'smart synchronization (Smart Sync)'.

The annotation information may have any of various types. For example, when a focus is to be on a particular region, image information used to focus on the particular region, e.g., a color, thickness, length, transparency, etc., may be transmitted to another device. In order to write a memo by separately extracting a text of the particular region in the form of a note, the annotation information may be generated using information and text data needed to display the note. When the first device 110 selects a particular diagram or chart, information about the diagram or chart may be generated as the annotation information and then be transmitted to another device. Examples of the annotation information may further include other information needed to appropriately display the annotation data on a device. For example, the annotation information may be information about device specifications, including page or image ID information and device resolution, or information about a time when or an order in which the annotation data is input. Also, the annotation information may include image ID information of the first device 110 that generates the annotation information.

If the types of the devices of the system are the same or the user interface for inputting the annotation data is compatible with an operating system or an application, the annotation information may be information about an input command. For example, when the first device 110 adds an annotation, the first device 110 does not generate information about the annotation in the form of an image and transmit the image to the second device 120 but may transmit information, which is input when the first device 110 adds the annotation, i.e., the input command, to the second device 120. The second device 120 may display the annotation on the screen of the second device 120, in the same manner that the annotation has input in the first device 110, based on the information about the annotation data, i.e., the input command.

If the types of the devices of the system are not the same, the devices of the system may have different resolutions. The size of the annotation data, e.g., an annotation, which is made according to the first device 110 acting as the host device, may be too large or small to be directly displayed on the second device 120. Thus, when the annotation information is generated based on collected device information, even though the annotation data is displayed other devices having different resolution from the first device 110, then annotation information may be generated to correspond to the annotation data displayed on the first device 110. Otherwise, when the second device 120 receives the annotation information from the first device 110, the second device 120 may reconstruct the annotation data, for example, according to the resolution thereof, through resizing to be appropriately displayed on the second device 120. Here, "appropriately" means that the presentation data and annotation data displayed on the first device 110 are displayed on the second device 120 maintaining the arrangement of all the items displayed in the first device 110.

The annotation information may include information about a point of time when each piece of the annotation data is input. The annotation data may be stored according to a time order (history) by using record time information. Also, the annotation data may be sequentially canceled or re-input. Each piece of the annotation data may be individually managed based on the record time information, and users of the devices of the system may selectively display or store a portion of the annotation data being smart-synchronized with the host device.

The location of the displayed annotation data may be adjusted according to user input. In particular, if the annotation data is an added note or chart that does not focus on a particular text or region, the location of the displayed annotation data may be adjusted according to a user preference.

Figure 6:
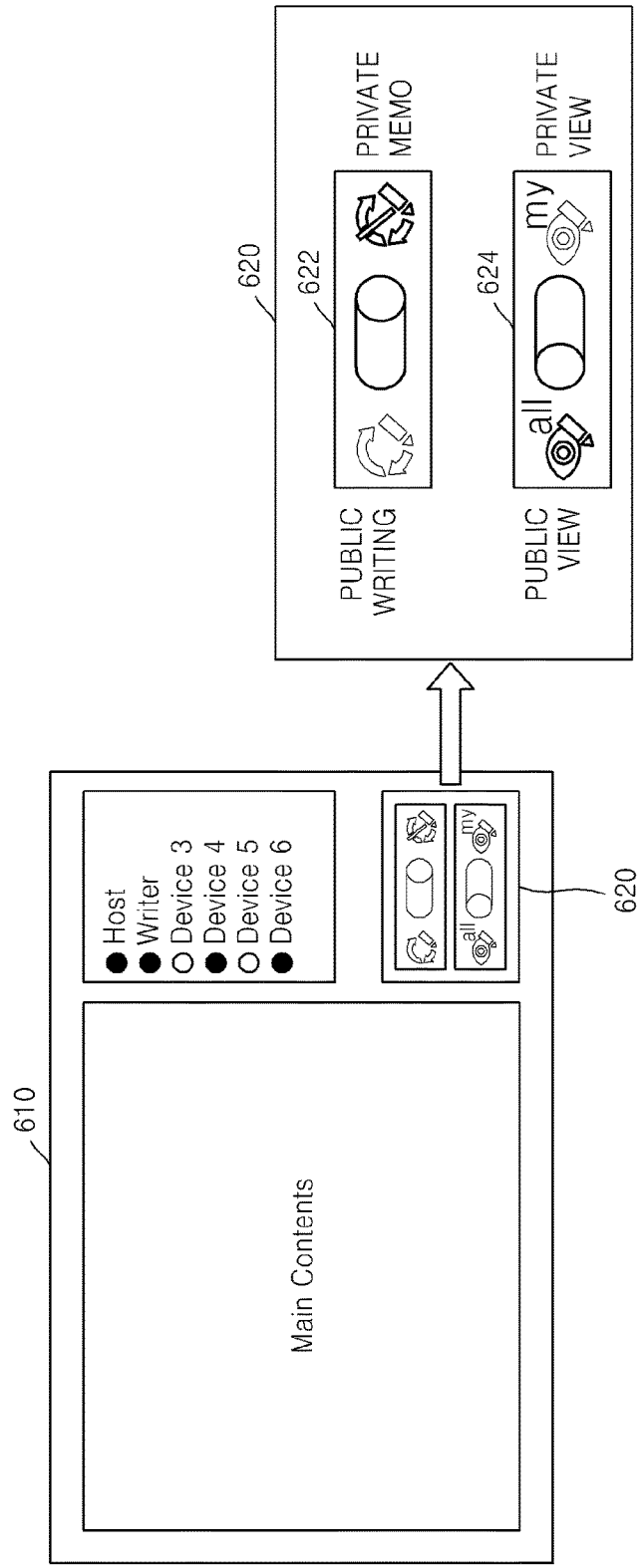
FIG. 6 illustrates a method of controlling synchronization or displaying of annotation data, based on a mode, according to an exemplary embodiment.

FIG. 6 illustrates a method of controlling synchronization or displaying of annotation data, based on a mode, according to an exemplary embodiment. A menu for annotation data synchronization and/or annotation data display mode change, i.e., an annotation data setting menu 620, may be located on a region of a screen 610 of a device that displays presentation data. An interface for setting a record mode 622 and an interface for setting a view mode 624 may be located in an upper region and a lower region of the annotation data setting menu 620, respectively.

The record mode 622 will now be described. When the record mode 622 indicates a private memo, annotation data that a user inputs is displayed only on a target device. In other words, the annotation information is not transmitted to other devices. However, annotation information including record time information which indicates the time the annotation is input for cancellation/re-input of the annotation data may be generated in this case. When the record mode 622 indicates public writing, the target device generates annotation information and transmits the annotation information to the other devices, based on user input. Each of the devices that receive the annotation information displays annotation data on a screen thereof, based on the received annotation information. In other words, the public writing means a state in which smart synchronization is activated.

The view mode 624 will now be described. If the view mode 624 indicates a public view, all synchronized annotation data is displayed. Annotation data of all devices that is input when the record mode 622 indicates public writing, is displayed. However, when the view mode 624 indicates a private view, only annotation data input from an input interface of a target device is displayed. That is, annotation data based on annotation information received from other devices is not displayed.

The current exemplary embodiment has been described with respect to a particular device of or all devices of a system, but may be performed in units of devices. For example, the record mode 622 may be set in units of devices. A user of a particular device may designate a device that may receive annotation information that the user inputs. Also, in the case of the view mode 624, a user of a particular device may view annotation data of only a desired device. For example, when a conference is conducted according to an exemplary embodiment, a device of a speaker or an important participant may be designated to selectively view annotation data of the designated device. As another example, a lecture may be delivered using a smart blackboard, according to an exemplary embodiment. In this case, a host device (e.g., a device of a professor) may receive a request to synchronize annotation data of a particular device (e.g., a device of a student) included in the system, from the particular device. Otherwise, a particular device may be designated and annotation data of the designated device may be synchronized. Optionally, all pieces of annotation data may be synchronized, and may be synchronized from when a request for the synchronization is received or device designation is performed until the request or device designation is canceled. When the host device accepts the request or a device is designated, annotation data received from this device is synchronized with all the devices of the system.

Such annotation data may be stored according to any of various methods. Each piece of annotation data may be separately stored together with record time information. Otherwise, annotation data, e.g., a memo, annotations, or underlines of each page, may be stored in the form of an image. The annotation data in the form of an image may be separately stored in such a manner that a background image thereof may be transparent. Otherwise, a state in which an image converted from presentation data and annotation data are combined together may be stored in the form of an image. Otherwise, presentation data may be stored in such a manner that corresponding annotation data may be added to each page of presentation data that is not converted into an image. Such an image and presentation data may be stored in a storage space of a device, an additional storage medium, a server, a file cloud, etc.

Figure 7:
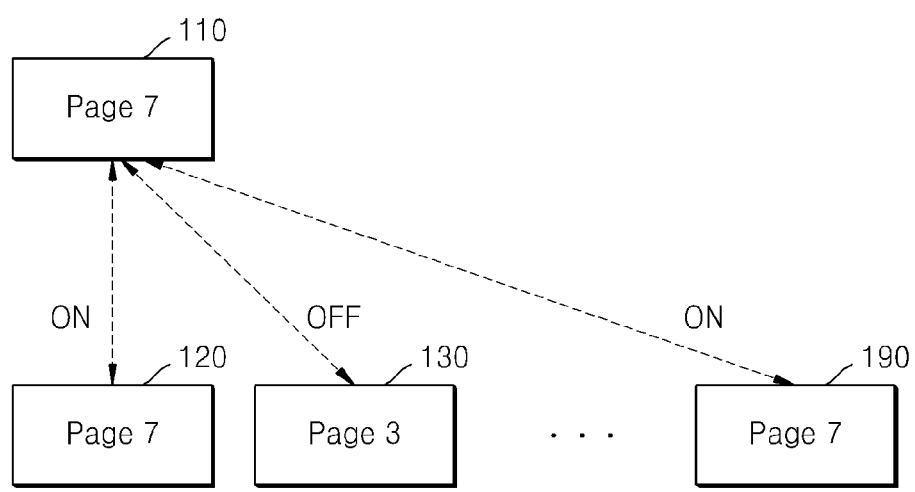
FIG. 7 is a block diagram illustrating page synchronization according to an exemplary embodiment.

FIG. 7 is a block diagram illustrating page synchronization according to an exemplary embodiment. Presentation data may be converted into images and may then be managed in units of pages. Page information may be image ID information. When a seventh page is displayed on a first device 110 which is a host device, a first device 110 transmits image ID information corresponding to the seventh page to each of devices. Each of the devices synchronizes a page corresponding to the received image ID information.

Page synchronization may be activated or deactivated according to a device setting. For example, when in a page synchronization mode, a third device 130 sets page synchronization to be 'OFF', a currently displayed page of the third device 130 is not changed and is maintained even though a currently displayed page of the first device 110, acting as a host device, are changed to some different page. The other devices, the page synchronizations of which are set to be 'ON', display the changed page displayed on the first device 110.

A process of smart-synchronizing annotation data in a state in which page synchronization is canceled (page non-synchronization mode) will now be described. Even though the third device 130 sets page synchronization to be 'OFF' but maintains smart synchronization, the third device 130 continuously receives annotation information from the first device 110. The annotation information may include information about an image displayed in a background of the third device 130 when the annotation data is input, or may include page information corresponding to the image. The third device 130 synchronizes the annotation data, based on the page information. That is, when the first device 110 inserts a particular memo into the seventh page, annotation information is generated based on the inserted memo and is then transmitted to all devices of a system. The second device 120, for example, which displays the seventh page displayed on the first device 110 appropriately displays annotation data, based on the received annotation information. However, since the third device 130 displays the third page, even though annotation data corresponding to the seventh page is generated, the annotation data is not displayed on the third device 130. When page synchronization of the third device 130 is activated, i.e., is 'ON', both the seventh page and annotation data displayed on the first device 110 are displayed on the third device 130.

Figure 8:
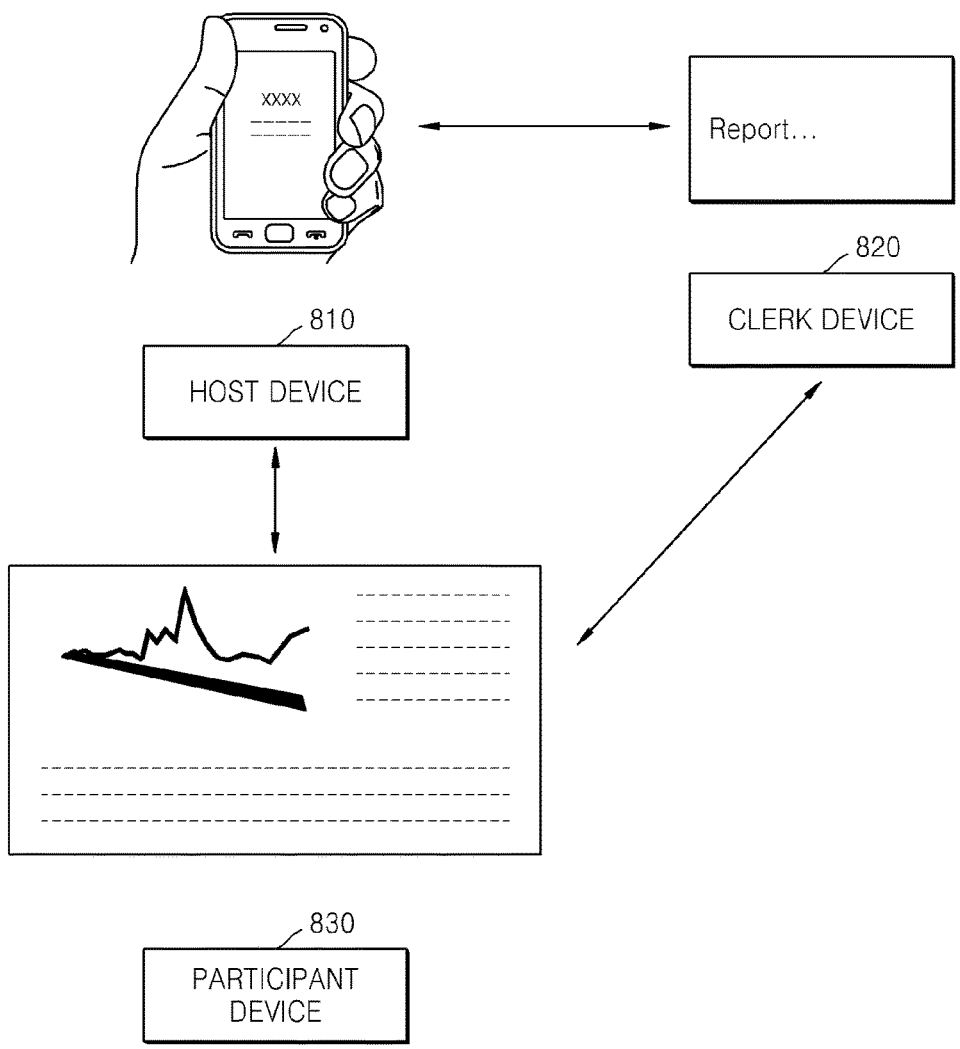
FIG. 8 is a block diagram of a presentation data sharing system according to another exemplary embodiment.

FIG. 8 is a block diagram of a presentation data sharing system 800 according to another exemplary embodiment. The presentation data sharing system 800 includes a host device 810, a clerk device 820, and a participant device 830. The host device 810 displays presentation data with script related thereto. In this case, only a portion of the presentation data may be converted into images and may then be transmitted to the participant device 830. When an interaction, e.g., turning pages, is performed by the host device 810, the interaction is directly reflected in all participant devices including the participant device 830, in real time. Since the scripts are displayed on the host device 810, a speaker who uses the host device 810 may conduct a conference based on the scripts. In this case, if the host device 810 has a volume up/down button or may recognize predetermined gestures or voice recognition, then it is possible to move to a desired page by using particular speech, e.g., by saying 'next'. Comments or memos may be input from the clerk device

820. Annotation information generated by the clerk device 820 may be transmitted to other devices of the presentation data sharing system 800 so as to share the annotation information.

Figure 9:
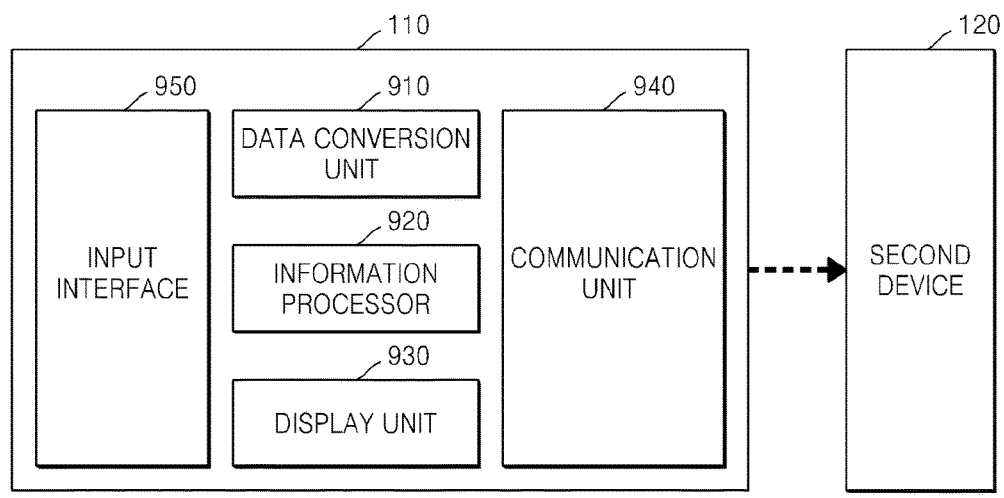
FIG. 9 is a block diagram of a host device according to an exemplary embodiment.

FIG. 9 is a block diagram of a host device according to an exemplary embodiment. Parts of descriptions regarding apparatuses and methods described with reference to FIGS. 9 to 12 below, which are redundant due to the above descriptions, are not provided here again. Referring to FIG. 9, a first device 110 includes a data conversion unit 910, an information processor 920, a display unit 930, a communication unit 940, and an input interface 950. The data conversion unit 910 converts presentation data into images. The communication unit 940 transmits the images to a second device 120. The data conversion unit 910 may convert the images to a last page of the presentation data, starting from a first page of the presentation data. The communication unit 940 may transmit the converted images to the second device 120 according to an order of completion of the conversion or according to a sequence of pages included in the presentation data. The display unit 930 displays a predetermined image from among the images converted from the presentation data. The predetermined image may correspond to the first page of the presentation data, may be set by a user, may be a presentation image that is last performed, or an image subsequent to the presentation image last performed. The information processor 920 generates image ID information about the displayed image, and the communication unit 940 transmits the image ID information to the second device 120. The second device 120 displays an image corresponding to the image ID information on a screen of the second device 120 from among the images.

The input interface 950 receives annotation data about the displayed image received from a user. The information processor 920 may generate annotation information including information needed for the second device 120 to express annotation data. The display unit 930 displays the annotation data on the displayed image, and the communication unit 940 transmits the annotation information to the second device 120.

When the image displayed on the display unit 930 of the first device 110 is switched to another image, the information processor 920 generates image ID information about the switched image and transmits the image ID information to the second device 120. If the received image ID information does not correspond to the image displayed on the second device 120, the second device 120 may switch the displayed image thereon to the image indicated by received the image ID information.

Figure 10:
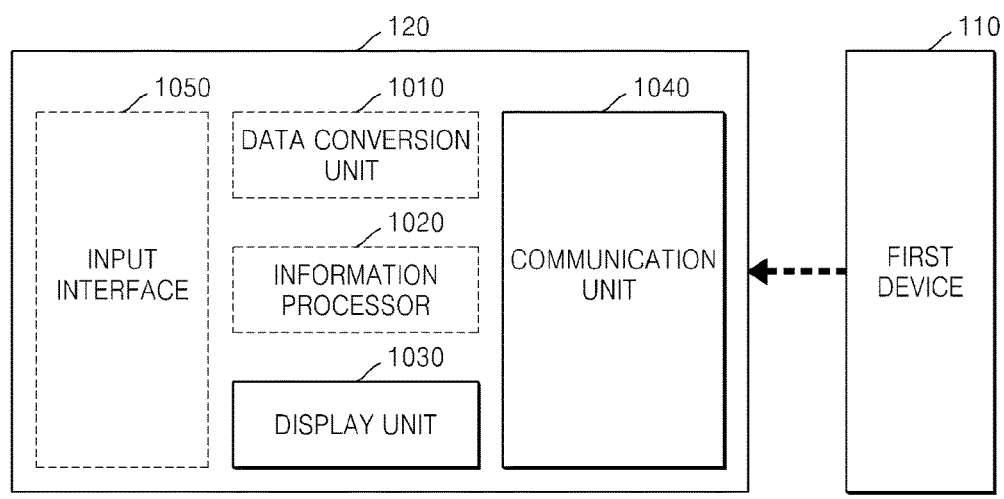
FIG. 10 is a block diagram of a participant device according to an e exemplary embodiment.

FIG. 10 is a block diagram of a second device 120 according to an exemplary embodiment. Basically, the second device 120 may have the same structure as that of a host device acting as the first device 110. In other words, whether a device is the participant device or the host device depends on an operation of the device, not on a structure thereof.

However, any device capable of performing only some of the operations described above with reference to FIG. 9 may act as the second device 120. The second device 120 may include a communication unit 1040 and a display unit 1030. The second device 120 may further include an input interface 1030.

The communication unit 1040 receives an image, image ID information, and annotation information from the first device 110. The image may be converted from presentation data by the first device 110. The image ID information identifies an image displayed on a screen of the first device 110. The annotation information includes information needed to express annotation data on a screen of a second device 120. The display unit 1030 displays an image from among received images, based on the image ID information, and displays annotation data on the displayed image, based on the annotation information.

A case where the second device 120 further includes an input interface unit 1050, a data conversion unit 1010, and an information processor 1020 may be the same as or similar to the cases described above and particularly with reference to FIGS. 1, 6, 7, and 9.

Figure 11:
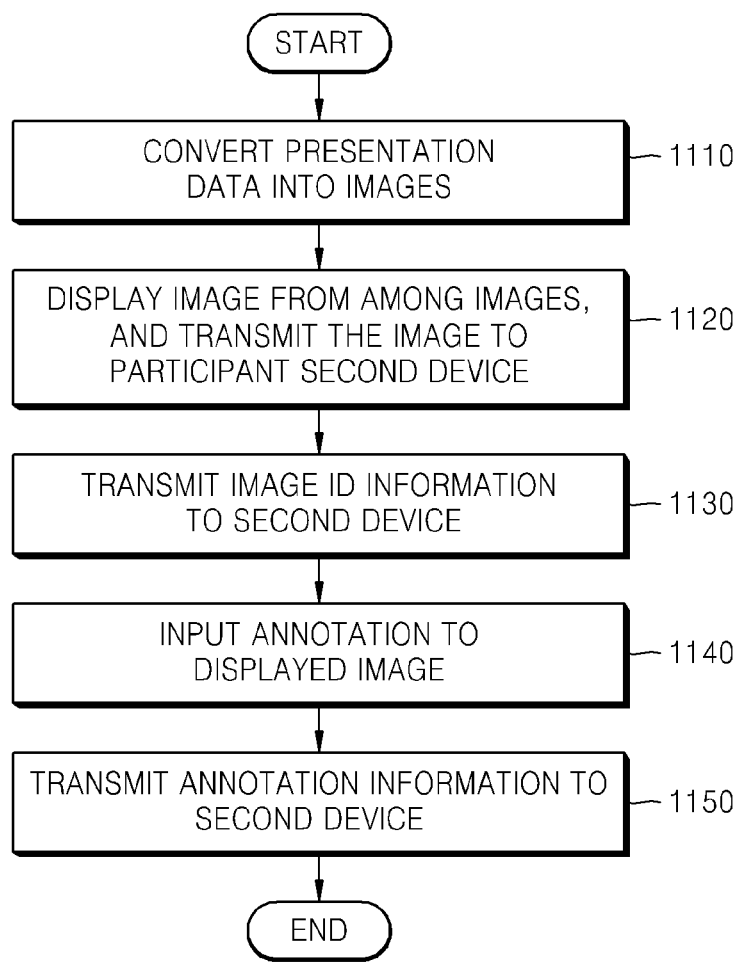
FIG. 11 is a flowchart illustrating a method of transmitting information for synchronizing presentation data, annotation data, and a displayed page to a participant device from a host device, according to an exemplary embodiment.

FIG. 11 is a flowchart illustrating a method of transmitting information for synchronizing presentation data, annotation data, and a displayed page to a participant device from a host device, according to an exemplary embodiment.

Referring to FIG. 11, the host device converts presentation data into images (operation 1110), displays an image from among the images on a screen thereof, and transmits the image to the second device (operation 1120). Then, the host device generates image ID information about the displayed image and transmits the image ID information to the second device (operation 1130). Then, when a user inputs an annotation to the displayed image (operation 1140), the host device generates annotation information and then transmits the annotation information to the second device (operation 1150).

Figure 12:
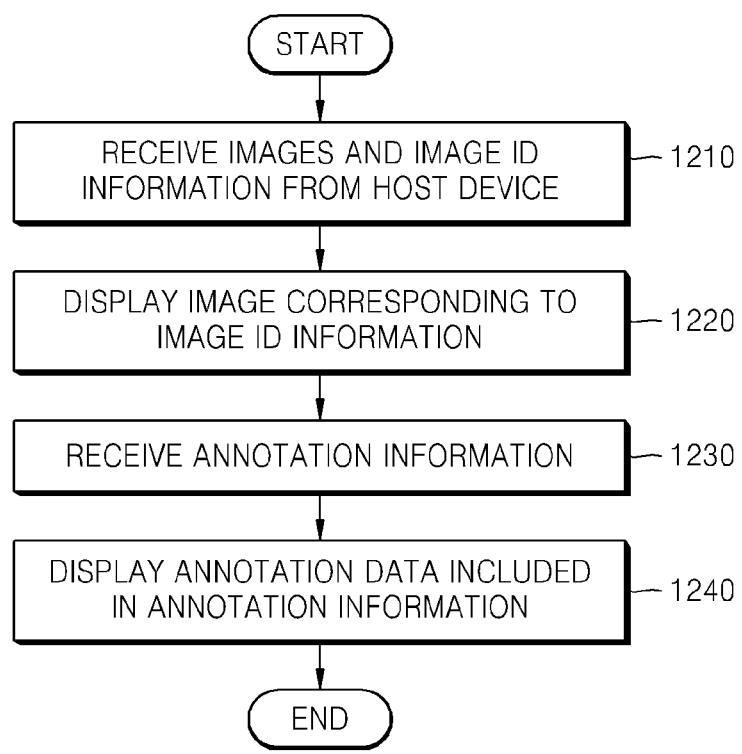
FIG. 12 is a flowchart illustrating a method of synchronizing a participant device with a host device, based on information received from the host device, according to an exemplary embodiment.

FIG. 12 is a flowchart illustrating a method of synchronizing a second device with a host device, based on information received from the host device, according to an exemplary embodiment.

Referring to FIG. 12, the second device receives images and image ID information from the host device (operation 1210). Then, the second device displays an image corresponding to the image ID information from among the images (operation 1220). Then, when receiving annotation information (operation 1230), annotation data included in the annotation information is displayed on the displayed image (operation 1240).

It would be interpreted by one of ordinary skill in the art that the block diagrams described in the exemplary embodiments conceptually indicate a circuit for realizing principles of the present inventive concept. Similarly, it would be obvious to one of ordinary skill in the art that a predetermined flowchart, a flow graph, a state transition diagram, and pseudo code may be substantially expressed in a computer-readable recording medium and indicate various processes executed by a computer or a processor, even if the computer or processor is not explicitly shown. Accordingly, the exemplary embodiments may be written as computer programs and implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The functions of various elements shown in diagrams may be provided by using not only hardware that executes suitable software, but also by exclusively using hardware. When the functions are provided by a processor, the functions may be provided by a single exclusive processor, a single common processor, or a plurality of individual processors, wherein some processors are shared. Also, the terms 'processor' and 'controller' shall not be interpreted to exclusively indicate hardware for executing software, and may unlimitedly and implicitly include digital signal processor (DSP) hardware, read-only memory (ROM) for storing software, random access memory (RAM), and a nonvolatile storage device.

In the claims, an element expressed as a unit for performing a certain function may include a predetermined method of performing the certain function, and may include a combination of circuit elements for performing the certain function, or software in a predetermined form including firmware or microcode combined with a suitable circuit for executing software for performing the certain function.

In the present specification, 'an exemplary embodiment' and other modified expressions mean that a certain feature, structure, or characteristic is included in at least one embodiment. Accordingly, the expression "an exemplary embodiment" and other modified examples in the present specification may not denote the same embodiment.

In the present specification, the expression "at least one of A and B" is used to include a selection of only A, only B, or both A and B. Furthermore, the expression "at least one of A through C" may be used to include a section of only A, only B, only C, only A and B, only B and C, or all of A through C. One of ordinary skill in the art would be able to clearly interpret a similar expression with more elements.

While this inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description but by the appended claims, and all differences within the scope will be construed as being included in the present inventive concept.

What is claimed is:

1. A method of annotating an image corresponding to a web page using an application executable by a device, the web page including a first portion and a second portion, the method comprising:
    displaying, by using the application, the first portion of the web page on a display of the device while the second portion of the web page is not displayed on the display;
    generating, by using the application, the image corresponding to the web page;
    displaying, by using the application, a first portion of the image corresponding to the first portion of the web page on the display;
    displaying, by using the application and based at least on an input on the displayed first portion of the image, a first annotation such that the displayed first annotation overlaps the displayed first portion of the image;
    displaying, by using the application and based at least on the first portion of the image being moved on the display, a second portion of the image corresponding to the second portion of the web page on the display;
    displaying, by using the application and based at least on an input on the displayed second portion of the image, a second annotation such that the displayed second annotation overlaps the displayed second portion of the image; and
    storing a first image file, by using the application and based at least on the first and second annotations and the image corresponding to the web page, in a storage of the device.

2. The method of claim 1, wherein the storing the first image file comprises:
    combining the first and second annotations with the image; and
    storing the combined the first and second annotations and the image as the first image file.

3. The method of claim 1, further comprising storing a second image file including the first and second annotations, but not the image corresponding to the web page, in the storage of the device.

4. The method of claim 1, wherein the first and second annotations comprise at least one of an underline, a highlight, an annotation, a diagram, a chart, and a memo.

5. The method of claim 3, wherein the second image file further comprises a transparent background.

6. The method of claim 1, further comprising sending the first image file to an external device.

7. A device for annotating an image corresponding to a web page using an application executable by the device, the web page including a first portion and a second portion, the device comprising:
    a storage for storing files and the application; and
    a processor configured to execute the stored application to at least:
        control to provide the first portion of the web page on a display of the device while a second portion of the web page is not provided on the display,
        control to generate the image corresponding to the web page,
        control to provide a first portion of an image corresponding to the first portion of the web page on the display of the device,
        control to provide, based at least on an input on the provided first portion of the image, a first annotation such that the provided first annotation overlaps the provided first portion of the image on the display,
        control to provide, based at least on the first portion of the image being moved on the display, the second portion of the image corresponding to the second portion of the web page on the display,
        control to provide, based at least on an input on the provided second portion of the image, a second annotation such that the displayed second annotation overlaps the provided second portion of the image, and
        control to store an first image file, based on the first and second annotations and the image corresponding to the web page, in the storage of the device.

8. The device of claim 7, wherein the storing the first image file comprises:
    combining the first and second annotations with the image; and
    storing the combined the first and second annotations and the image as the first image file.

9. The device of claim 7, wherein the processor is further configured to store a second image file including the first and second annotations, but not the image corresponding to the web page, in the storage of the device.

10. The device of claim 7, wherein the first and second annotations comprise at least one of an underline, a highlight, an annotation, a diagram, a chart, and a memo.

11. The device of claim 9, wherein the second image file further comprises a transparent background.

12. The device of claim 7, the processor is further configured to send the first image file to an external device.

13. A non-transitory computer readable recording medium having recorded therein instructions including an application executable by a processor of a device to cause the processor to perform a method of annotating an image corresponding to a web page using the application, the web page including a first portion and a second portion, the method comprising:
  controlling to provide, via the application, the first portion of the web page on a display of the device while a second portion of the web page is not provided on the display;
  controlling to generate the image corresponding to the web page;
  controlling to provide, via the application, the first portion of an image corresponding to a first portion of the web page on the display;
  controlling to provide, via the application and based at least on an input on the provided first portion of the image, a first annotation such that the provided first annotation overlaps the provided first portion of the image;
  controlling to provide, via the application and based on the first portion of the image being moved on the display, the second portion of the image corresponding to the second portion of the web page on the display;
  controlling to provide, via the application and based at least on an input on the provided second portion of the image, a second annotation such that the provided second annotation overlaps the provided second portion of the image; and
  controlling to store a first image file, based on the first and second annotations and the image corresponding to the web page, in a storage of the device.

14. The non-transitory computer readable recording medium of claim 13, wherein the controlling to store the first image file comprises:
  combining the first and second annotations with the image; and
  storing the combined first and second annotations and the image as the first image file.

15. The non-transitory computer readable recording medium of claim 13, further comprising controlling to store a second image file including the first and second annotations but not the image corresponding to the web page, in the storage of the device.

16. The non-transitory computer readable recording medium of claim 13, wherein the first and second annotations comprises at least one of an underline, a highlight, an annotation, a diagram, a chart, and a memo.

17. The non-transitory computer readable recording medium of claim 13, wherein the second image file further comprises a transparent background.

18. The non-transitory computer readable recording medium of claim 13, further comprising controlling to send the first image file to an external device.

19. A method of annotating an image corresponding to a web page using an application executable by a device, the web page including a first portion and a second portion, the method comprising:
  controlling to provide, via the application, the first portion of the web page on a display of the device while a second portion of the web page is not provided on the display;
  controlling to generate the image corresponding to the web page;
  controlling to provide, via the application, a first portion of an image corresponding to the first portion of the web page on the display;
  controlling to provide, via the application and based on an input over the provided first portion of the image, a first annotation such that the provided first annotation overlaps the provided first portion of the image;
  controlling to provide, via the application and based on the first portion of the image being moved on the display, the second portion of the image corresponding to the second portion of the web page on the display;
  controlling to provide, via the application and based at least on an input on the provided second portion of the image, a second annotation such that the provided second annotation overlaps the provided second portion of the image; and
  controlling to store a first image file, based on the first and second annotations and the image corresponding to the web page, in a storage of the device.

20. The method of claim 1, wherein the input comprises a handwritten input.

21. The device of claim 7, wherein the input comprises a handwritten input.

22. The non-transitory computer readable recording medium of claim 13, wherein the input comprises a handwritten input.

23. The method of claim 19, wherein the input comprises a handwritten input.

* * * * *